(12) United States Patent
O'Connor et al.

(10) Patent No.: US 9,644,501 B2
(45) Date of Patent: May 9, 2017

(54) HEAT CAPTURING MODULE AND POWER GENERATING SYSTEM INCORPORATING THE MODULE

(71) Applicant: Air Burners, Inc., Palm City, FL (US)

(72) Inventors: Brian M. O'Connor, Palm City, FL (US); Thomas Foley, Saint Augustine, FL (US)

(73) Assignee: Air Burners, Inc., Palm City, FL (US)

( * ) Notice: Subject to any disclaimer, the term of this patent is extended or adjusted under 35 U.S.C. 154(b) by 343 days.

(21) Appl. No.: 14/534,765

(22) Filed: Nov. 6, 2014

(65) Prior Publication Data

US 2016/0130985 A1 May 12, 2016

(51) Int. Cl.
| | |
|---|---|
| *F01K 25/10* | (2006.01) |
| *F01K 13/00* | (2006.01) |
| *F28D 15/00* | (2006.01) |
| *F23L 17/00* | (2006.01) |
| *F28D 15/02* | (2006.01) |
| *F23G 5/46* | (2006.01) |
| *F23G 7/10* | (2006.01) |
| *F01K 5/00* | (2006.01) |

(52) U.S. Cl.
CPC ............... *F01K 25/10* (2013.01); *F01K 5/00* (2013.01); *F23G 5/46* (2013.01); *F23G 7/10* (2013.01); *F23L 17/005* (2013.01); *F28D 15/00* (2013.01); *F28D 15/02* (2013.01); *Y02E 20/12* (2013.01)

(58) Field of Classification Search
CPC ... F01K 23/064; F01K 23/067; F01N 2240/20
USPC ............. 60/685–697, 657, 668, 670; 454/49, 454/63–67; 137/38–46, 615–616.7, 801; 122/1 R
See application file for complete search history.

(56) References Cited

U.S. PATENT DOCUMENTS

| | | | | |
|---|---|---|---|---|
| 3,974,645 | A | * | 8/1976 | Smith ................... F01K 23/105 290/40 C |
| 6,536,360 | B2 | | 3/2003 | O'Connor |
| 8,523,559 | B2 | | 9/2013 | Suljak et al. |
| 2008/0289313 | A1 | * | 11/2008 | Batscha ................. F01K 25/08 60/39.5 |

(Continued)

OTHER PUBLICATIONS

Green machine 6500, ElectraTherm, www.electratherm.com, at least as early as Aug. 22, 2014.

*Primary Examiner* — Laert Dounis
(74) *Attorney, Agent, or Firm* — Hodgson Russ LLP

(57) ABSTRACT

A heat capturing module for obtaining useful energy from waste heat includes an extendable hood directing hot gas through a heat exchange assembly having a plurality of heat pipes. A closed flow loop directs a heat transfer medium through the heat exchange assembly to heat the heat transfer medium, and directs the heated medium for use by an application. In one embodiment, the closed flow loop directs the heat transfer medium through an organic Rankine cycle unit where heat is converted to electrical power. An exhaust system having a variable-speed induction fan induces flow of the hot gas through the heat exchange assembly. The speed of the induction fan may be controlled to maintain a setpoint temperature of the heat transfer medium. The hood may be extended and retracted based on a measured temperature of gas at an intake region of the hood. The module is transportable by truck trailer.

21 Claims, 10 Drawing Sheets

(56) References Cited

U.S. PATENT DOCUMENTS

2012/0235423 A1 9/2012 O'Connor
2012/0261090 A1* 10/2012 Durmaz .................. F01K 13/02
                                                                                  165/11.1

* cited by examiner

HEAT CAPTURING MODULE AND POWER GENERATING SYSTEM INCORPORATING THE MODULE

FIELD OF THE INVENTION

The present invention relates to equipment for capturing waste heat for other uses. More particularly, the present invention relates to equipment usable adjacent a firebox or fire pit where biomass or other waste is burned to capture waste heat from the combustion and convert it, for example, to electrical power.

BACKGROUND OF THE INVENTION

U.S. Pat. No. 6,536,360 assigned to the present applicant discloses an air-curtain firebox designed to capture waste heat for useful applications. The heat is recovered from the side walls of the firebox, which radiate between 400 and 600 degrees Fahrenheit, using heat transfer panels to heat water circulating through tubing in the panels. The heated water is typically pumped to a radiator located in a building or greenhouse where air is heated to either warm a facility or provide process heat. The system taught by U.S. Pat. No. 6,536,360 has limitations. The captured heat is not converted to another form of energy, such as electricity. The system providing circulating water within the firebox walls requires maintenance, and leaks within the system can lead to significant downtime for repairs. This downtime may include burning downtime, not just power generation downtime.

U.S. Patent Application Publication No. 2012/0235423 A1 assigned to the present applicant discloses an air-curtain firebox system configured to generate electrical power from waste heat. In one embodiment, the system has heat transfer panels within side walls of a firebox for recovering heat in a manner similar to the firebox described in U.S. Pat. No. 6,536,360. In another embodiment, heat is recovered from an exhaust plume rising from the firebox near a side wall of the firebox opposite the air-curtain manifold. The heat from the exhaust plume is recovered by a heat recovery roof that extends partially over the firebox and contains heat transfer panels of the type described in U.S. Pat. No. 6,536,360. In the mentioned embodiments, the heat transfer panels carry a heat transfer medium, such as an environmentally benign refrigerant or a water solution, that changes from a liquid state to a gaseous state and rapidly expands when heated. The expanding gaseous heat transfer medium serves as a working fluid to drive a turbine or other type of expander of an electric generator to generate power. The heat transfer medium is condensed and cycled back through the heat transfer panels so the process can be repeated. Here again, internal leakage within the panels may lead to downtime when power cannot be generated and burning must be temporarily halted. In addition, the efficiency of the system suffers because the combustion heat fluctuates as biomass fuel is depleted and replenished, and there is no means to regulate heat transfer from the combustion plume to the heat transfer medium. For example, the heat transfer medium may expand faster than is optimal for driving the generator turbine, resulting in a loss of energy and a decrease in efficiency.

A further problem encountered in waste heat power generating systems of the prior art is the build-up of heat and pressure of the heat transfer medium that may occur if the generator goes offline. Prior art systems have dealt with this problem by providing an auxiliary bypass system having dump tanks, cooling means, and associated pumps and controls. This adds significant cost and complexity to the overall system.

Finally, many known systems for converting waste heat to electrical power are configured for use at a source of waste heat that remains at a fixed location, for example within a building where process equipment is housed. Those systems that are designed for travel to different locations, for example systems built directly into a portable air curtain firebox as discussed above, may only be used with that particular firebox, and cannot be used with another firebox or a fire pit.

What is needed is an improved heat capturing module and a power generating system that address the problems described above.

SUMMARY OF THE INVENTION

In accordance with the present invention, a heat capturing module and a related power generating module and system are provided.

In one embodiment of the present invention, a skid-mounted heat capturing module transportable by truck trailer is provided. The heat capturing module generally comprises a frame, a hood mounted on the frame for movement relative to the frame between a retracted position and an extended position, an actuator operable to move the hood between the retracted and extended positions, and a heat exchange assembly in flow communication with an internal space of the hood for receiving hot gas from the hood. The heat capturing module also comprises a controller connected to the actuator, a human-machine interface operable to enter data into the controller, and sensors to provide feedback to the controller. Finally, the heat capturing module comprises a closed flow loop or a flow loop portion carrying a heat transfer medium, wherein the closed flow loop or flow loop portion directs flow of the heat transfer medium through the heat exchange assembly, then to an external system to provide thermal energy to the external system, and then back to the heat exchange assembly.

In one aspect of the invention, the heat capturing module comprises an exhaust system including a variable speed induction fan connected to the controller, whereby the intake flow of hot gas into the hood may be controlled in order to maintain a selected setpoint temperature of the heat transfer medium. In another aspect of the invention, the position of the hood is controllable to maintain the temperature of the heat transfer medium within a desired working range, and the hood may be retracted to avoid overheating the heat transfer medium if the external system that uses the heat goes offline.

The heat capturing module may be transported to sites where fireboxes and/or fire pits are used to burn biomass, and is independent of the biomass burn container so that it may be used with any chosen burn container.

In another embodiment of the present invention, a power generating system is provided by connecting a heat capturing module as described above to an organic Rankine cycle unit that converts heat from the heat transfer medium into electrical power. The power generating system may be configured as a transportable power generating module by mounting the organic Rankine cycle unit on the same skid frame as the components of the heat capturing module. Here again, the system and module are independent of the burn container.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
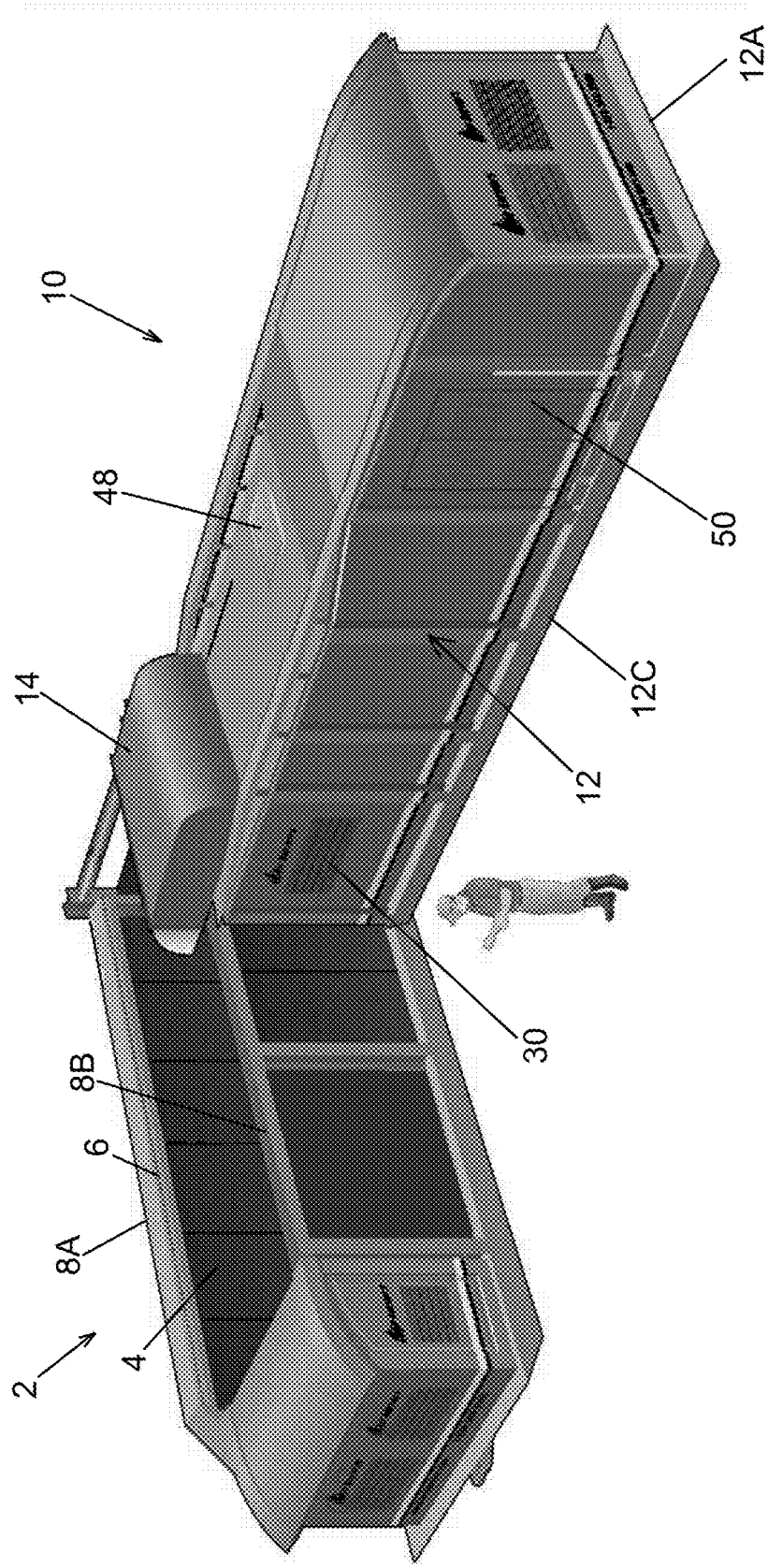
FIG. 1 is perspective view of a power generating module formed in accordance with an embodiment of the present invention, wherein the power generating module is shown adjacent an air curtain firebox.

FIG. 1 depicts a power generating module 10 formed in accordance with an embodiment of the present invention. Power generating module 10 is shown adjacent an air curtain firebox apparatus 2 of a type that includes a firebox 4 and an air curtain manifold 6 along a side 8A of firebox 4 by which a curtain of high-velocity air is directed generally over and across the firebox to an opposite side 8B of the firebox. Firebox apparatus 2 may be a portable unit used to burn biomass or other waste at a worksite, such as real property being cleared for development, so the waste does not need to be hauled away. Power generating module 10 of the present invention may be positioned adjacent to firebox apparatus 2 and is useful for capturing heat released by combustion of waste in firebox 4 and converting the heat to electrical power that may be used at the worksite or sold to a public utility company or private buyer.

Reference is also made now to FIGS. 2-7 for describing power generating module 10. Power generating module 10 comprises a structural frame 12 which may include welded steel members. In the present embodiment, frame 12 is configured such that module 10 is transportable on a truck trailer. Frame 12 includes a pair of ends 12A, 12B connected by a pair of longitudinal sides 12C, 12D to define an elongated rectangular footprint. Frame 12 further includes cross members 12E, vertical members 12F, and beams 12G. Longitudinal sides 12C, 12D and front end 12A may be configured in the form of a skid enabling module 10 to be loaded onto a truck trailer.

Power generating module 10 also comprises a hood 14 defining an internal space 16 and having a bottom intake opening 18 in flow communication with the internal space 16. Hood 14 is mounted on frame 12 for movement in a horizontal plane relative to the frame between a retracted position (FIG. 5A) and an extended position (FIG. 5B), wherein hood 14 is capable of receiving a plume of hot gas through bottom intake opening 18 when the hood is in the extended position. In the current embodiment, hood 14 is mounted on frame 12 by parallel tracks 24 enabling hood 14 to travel along a linear path between the refracted and extended positions. Each track 24 interfaces with a plurality of guide wheels 22 rotatably supported by a wheel mounting beam 20 of frame 12 adjacent an associated side of hood 14. Alternatively, hood 14 may be mounted on frame 12 for pivotal motion relative to the frame. For example, hood 14 may be mounted to pivoted in about a vertical axis between the retracted and extended positions. As another example, hood 14 may be mounted on frame 12 by a hinge allowing the hood to pivot upward about a horizontal hinge axis to the retracted position and downward about the horizontal hinge axis to the extended position. Based on studies of the location and extent of the hot air plume that rises from air curtain fireboxes made by applicant, a module wherein the retracted position and the extended position are approximately sixteen inches apart allows for efficient heat capture without undue extension of hood 14.

Figure 5A:
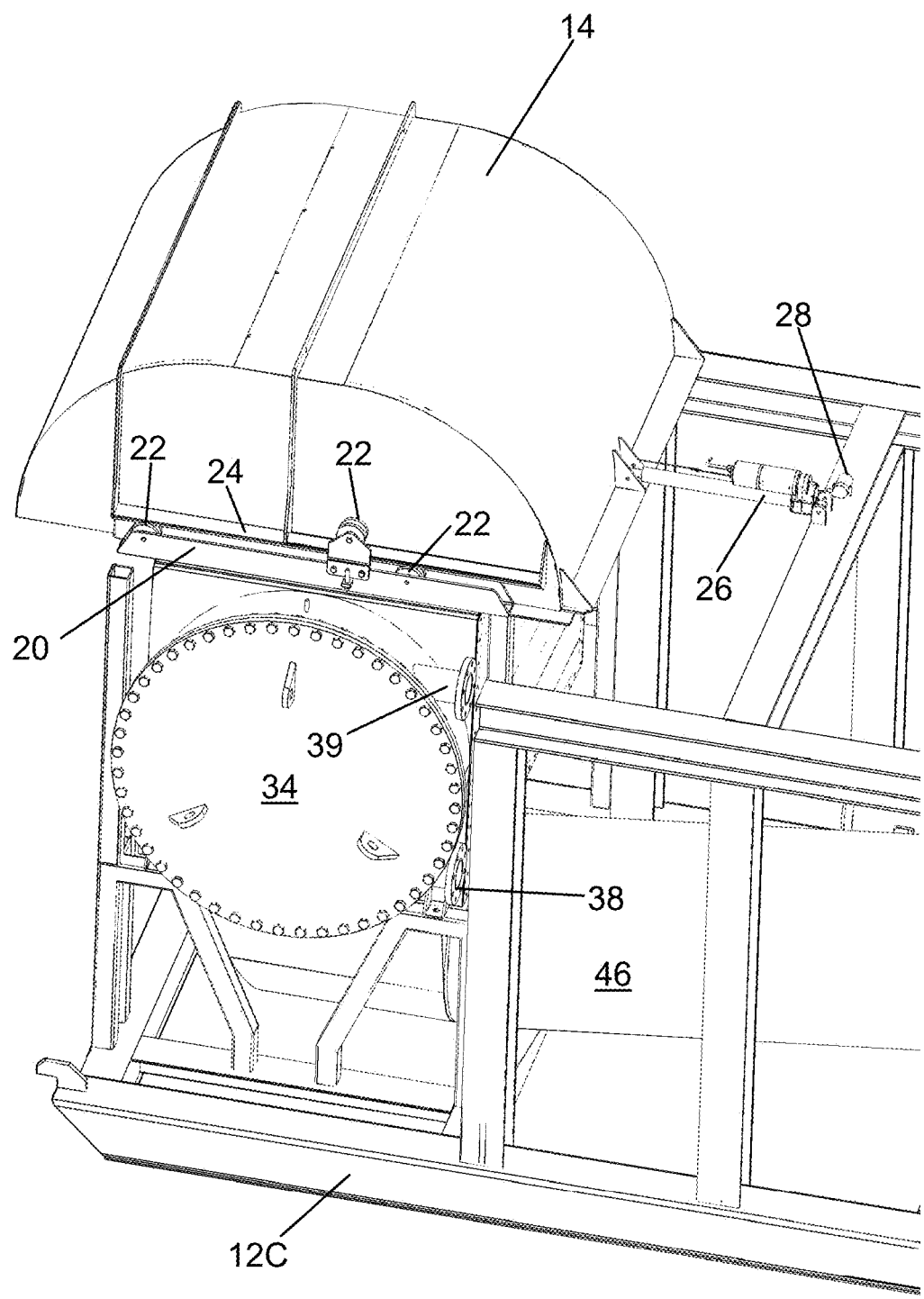
FIG. 5A is perspective view showing the hood of the power generating module in its retracted position.
Figure 5B:
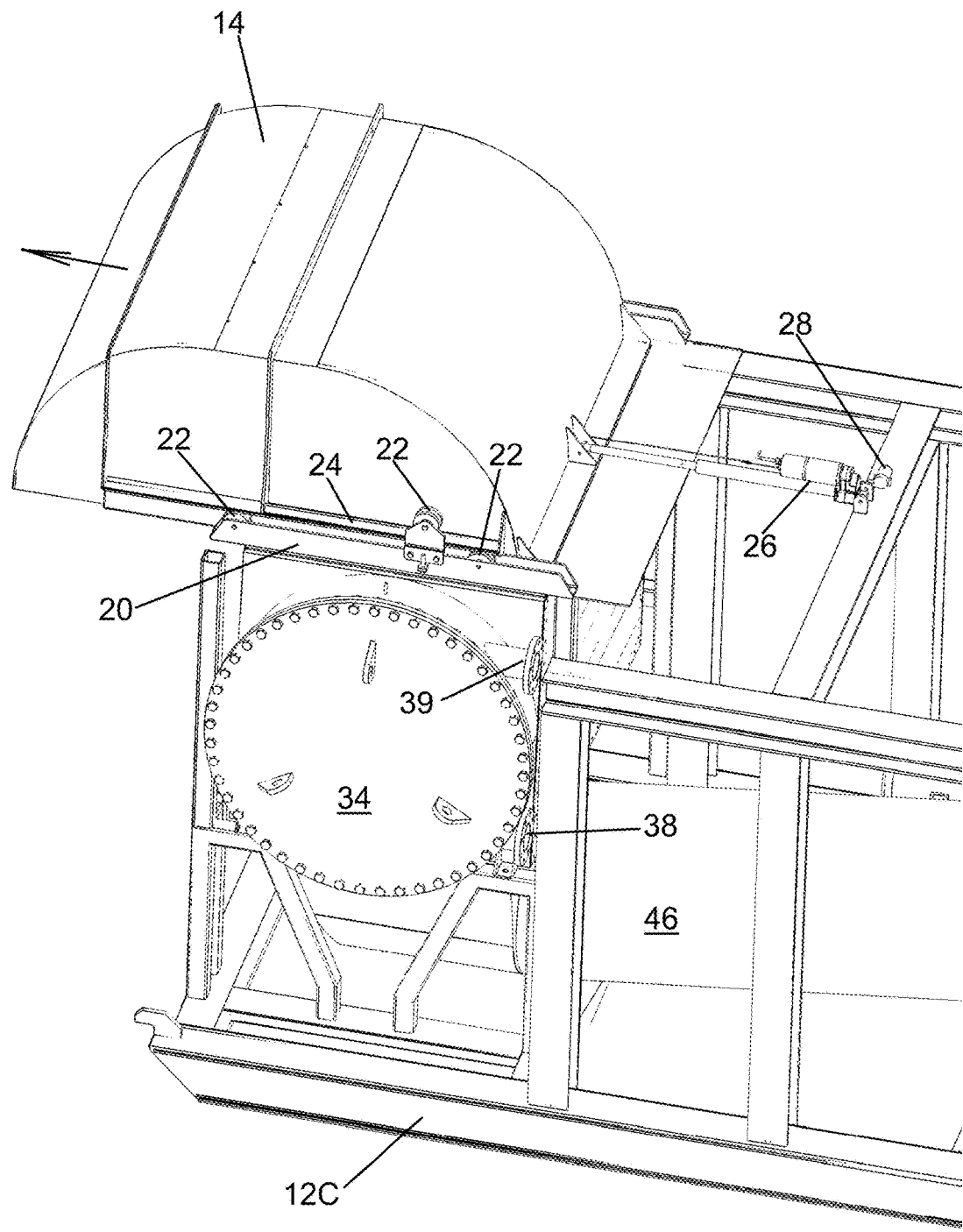
FIG. 5B is perspective view showing the hood of the power generating module in its extended position.
Figure 6:
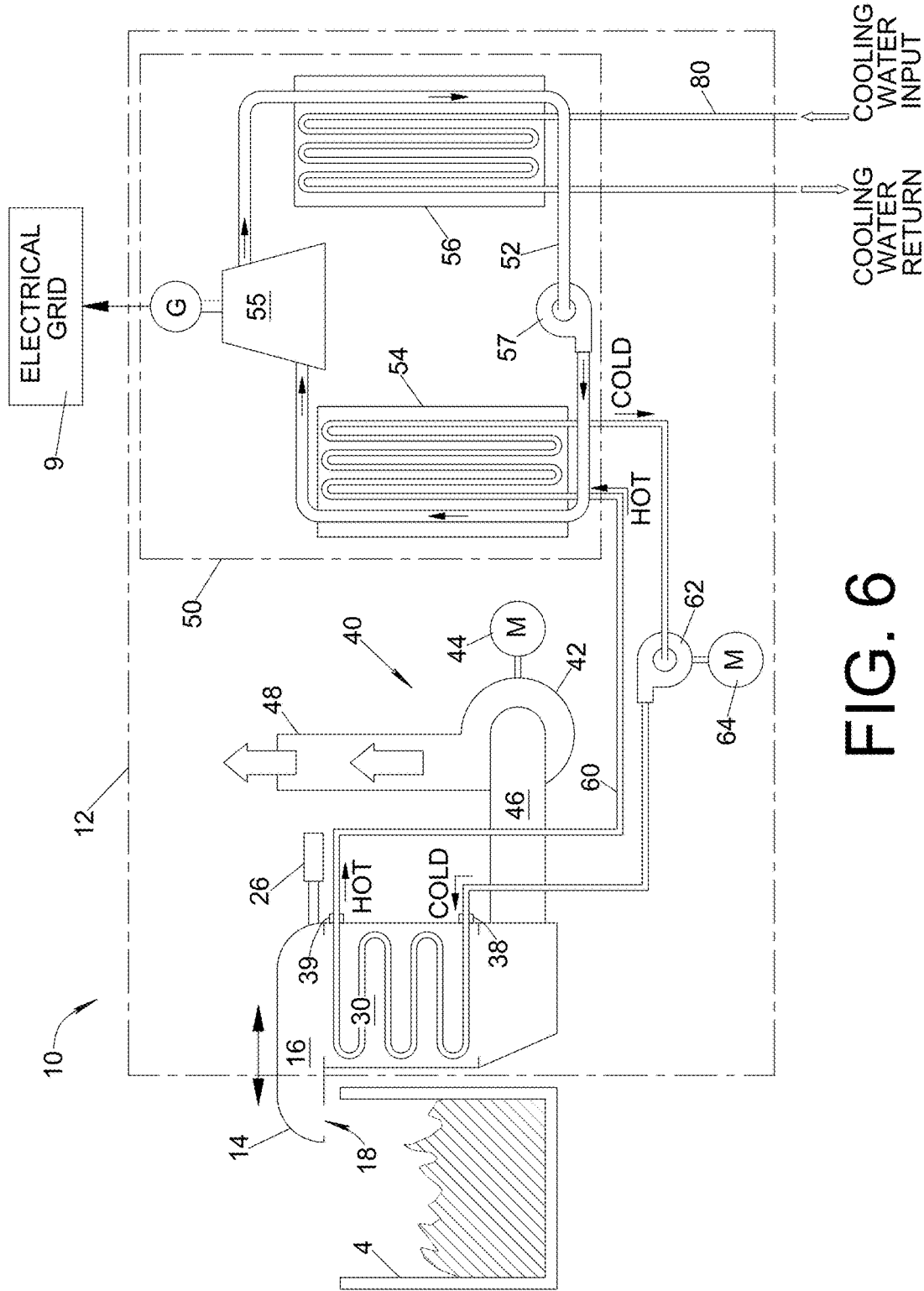
FIG. 6 is a schematic process diagram of the power generating module shown in FIGS. 1-3.

Module 10 comprises at least one actuator 26 connected to hood 14 and operable to move the hood between the retracted and extended positions. As best seen in FIGS. 5A and 5B, module 10 of the present embodiment includes a single linear actuator 26 having one end mounted to frame 12 and an opposite end mounted to hood 14. Actuator 26 may be commanded to move hood 14 between the retracted and extended positions, and may be commanded to stop at those positions or at any intermediate position therebetween. A position sensor 28 may be arranged to measure the position of hood 14 relative to a reference position, such as the retracted position, and provide an electronic position signal representing the measured position of the hood. Position sensor 28 may be an external sensor that is external to actuator 26, such as a string potentiometer, encoder, or limit switches. Alternatively, position sensor 28 may be embodiment as a sensor internal to actuator 26, such as an LVDT, for generating a position signal representing the position of hood 14. While a linear actuator 26 is provided in the current embodiment, those skilled in the art will recognize that a rotary actuator may be provided in cooperation with a linkage designed to convert rotational motion to linear motion. The type of actuator(s) and position sensor used, and the means of connecting the actuator(s) to the hood, are subject to design choice and wide variation, wherein the manner in which hood 14 moves relative to frame 12 (i.e. linear or pivotal travel) is a consideration.

Figure 4:
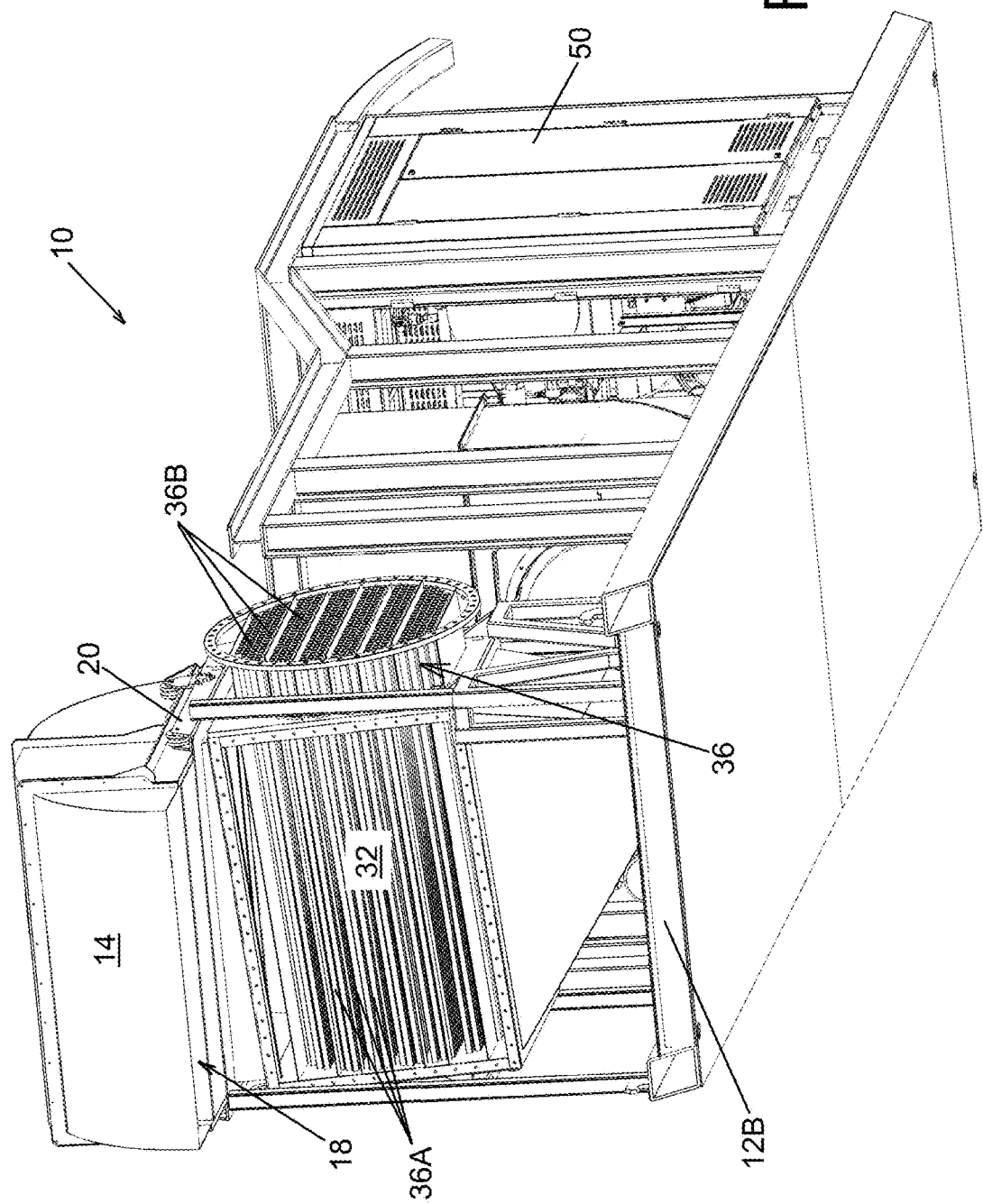
FIG. 4 is a perspective view showing a retractable hood and internal components of a heat transfer assembly of the power generating module.

Power generating module 10 further comprises a heat exchange assembly 30 in flow communication with the internal space 16 of hood 14 for receiving hot gas from the hood. Hood 14 may provide a curved conduit generally in an inverted U-shape for redirecting the rising hot gas such that the hot gas flows downward through heat exchange assembly 30. Heat exchange assembly 30 may include a plenum chamber 32 through which the hot waste gas flows, a shell portion 34 sealed off from fluid communication with plenum chamber 32, and a plurality of heat pipes 36 extending between plenum chamber 32 and shell portion 34. Each heat pipe has a hot interface 36A arranged in plenum chamber 32 and a cold interface 36B arranged in shell portion 34. As will be understood by persons familiar with heat pipe technology, each heat pipe 36 has an elongated internal cavity enclosing a fluid. The enclosed fluid evaporates from liquid to vapor at the hot interface 36A, migrates along the cavity to the cold interface 36B, condenses back to liquid and is absorbed by a wick material surrounding the cavity, and then flows back to hot interface 36A to repeat the cycle. To assist the return flow of liquid from cold interface 36B to hot interface 36A using gravity, heat pipes 36 may be orientated at an incline with cold interface 36B higher than hot interface 36A as shown in FIG. 4. Shell portion 34 includes an input port 38 and an output port 39, both ports being visible in FIGS. 5A and 5B. While heat exchange assembly 30 is disclosed as using heat pipes 36 as a means of heat exchange, other types of heat exchange means may be substituted, including without limitation shell and tube heat exchange means, plate heat exchange means, and fin heat exchange means.

Power generating module 10 may also comprise an exhaust system 40 configured to direct exhaust gas from heat exchange assembly 30 to atmosphere. In the illustrated embodiment, exhaust system 40 includes an induction fan 42 having a variable speed fan motor 44. The speed of induction fan motor 44 may be adjusted, as described below, to control the rate at which hot gas flows through heat exchange assembly 30. Exhaust system 40 may further include a duct 46 and an exhaust chute 48 for directing the flow of gas out to atmosphere.

Power generating module 10 is configured to use heat captured by heat transfer assembly 30 for driving an organic Rankine cycle ("ORC") unit 50 supported by frame 12 to generate electric power. As may be seen in FIG. 6, ORC unit 50 has a working fluid loop 52 including an evaporator 54, an electric generator 55, and a condenser 56. A pump 57 may be provided in working fluid loop 52 between condenser 56 and evaporator 54 to maintain a desired flow rate of the working fluid in loop 52. A coolant supply path 80 may be connected to ORC unit 50 for delivering flow of a coolant, such as cold water pumped from a local water source, cooling tower or other device, to condenser 56 for condensing the working fluid.

ORC unit 50 also includes local control electronics 58 (shown in FIG. 7) for controlling the unit's operating components and power output. By way of non-limiting example, ORC unit 50 may be a Green Machine 6500 ORC available from ElectraTherm, Inc. of Reno, Nev. The Green Machine 6500 ORC is capable of generating up to 110 kW of electric power. A portion of the power generated by ORC unit 50 may be delivered to an external power grid 9, and another portion of the power generated by ORC unit 50 may be used by components of module 10 or stored for later use.

In the illustrated embodiment, heat captured by heat transfer assembly 30 is made available to ORC unit 50 by a closed flow loop 60 carrying a heat transfer medium, for example water or thermal oil. Closed flow loop 60 is configured to direct flow of the heat transfer medium in a closed loop extending through heat exchange assembly 30 and through evaporator 54. Closed flow loop 60 includes a pump 62 driving flow of the heat transfer medium through loop 60. In an embodiment of the present invention, pump 62 may be driven by a variable speed pump motor 64, whereby a flow rate of the heat transfer medium through flow loop 60 is adjustable by varying the speed of pump motor 64.

In the illustrated embodiment, the heat transfer medium enters shell portion 34 of heat exchange assembly 30 through input port 38 in a relatively cooled state, where it comes into contact with heat pipes 36 and is heated. The heat transfer medium exits shell portion 34 of heat exchange assembly 30 through output port 39 and enters evaporator 54 of ORC unit 50 in a relatively heated state. Heat carried by the heat transfer medium is transferred to the working fluid in loop 52 to evaporate the working fluid. The heat transfer medium exits evaporator 54 and returns to heat exchange assembly 30 in a relatively cooled state.

Figure 7:
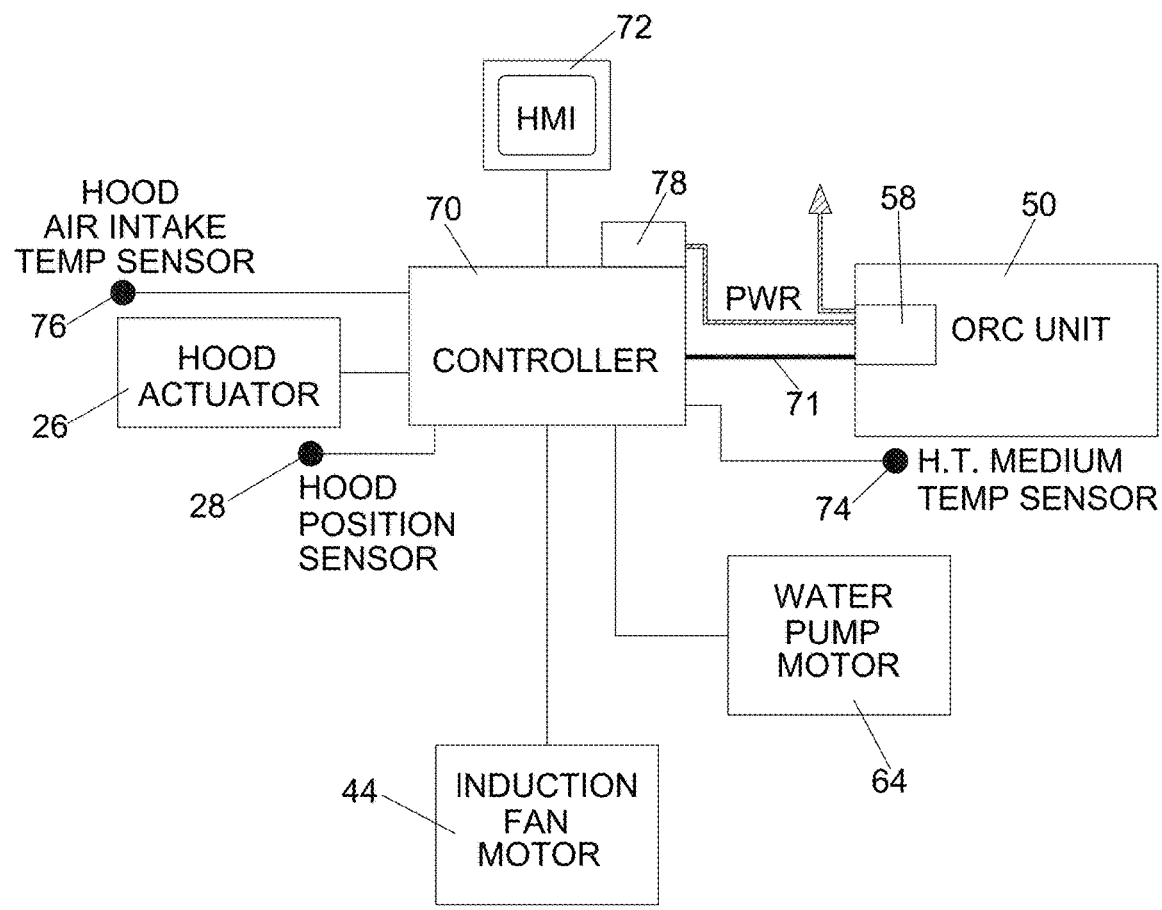
FIG. 7 is a schematic block diagram illustrating control electronics of the power generating module shown in FIGS. 1-3.

Reference is made now to FIG. 7 to describe a control architecture that may be used by power generating module 10. In an embodiment of the invention, power generating module 10 may comprise a controller 70 and a human-machine interface ("HMI") 72 in data communication with controller 70. Controller 72 may be a programmable logic controller or other processor-based controller having memory for storing programming instructions and inputs entered by way of human-machine interface. A suitable controller known to applicant is the DO-MORE™ programmable logic controller available from Automation Direct of Cumming, Ga. HMI 72 may be a touchscreen display, computer terminal, or similar means allowing an operator to input data into controller 70.

In addition to receiving data entered by an operator using HMI 72, controller 70 is also in communication with various sensors monitoring physical parameters and process conditions associated with operation of module 10. More specifically, module 10 may include a first temperature sensor 74 arranged to measure a temperature of the heat transfer medium in closed flow loop 60 when the heat transfer medium is in a heated state after passing through heat exchange assembly 30 and prior to passing through evaporator 54. In FIG. 7, temperature sensor 74 is illustrated at a location where the heat transfer medium enters ORC unit 50, however temperature sensor 74 may be located elsewhere along closed flow loop 60. Module 10 may also include a second temperature sensor 76 arranged on or near intake opening 18 of hood 14 to measure the temperature of hot gas as it enters the hood. Controller 70 is also in communication with hood position sensor 28. Controller 70 may be connected to provide control commands to actuator 26, induction fan motor 44, and pump motor 64.

As shown in FIG. 7, controller 70 may be connected to receive AC electrical power from ORC unit 50. A rechargeable power storage unit 78 may be associated with controller 70 to store power for later use. Controller 70 may receive power from other sources (not shown) including batteries or other AC power sources. For example, controller 70 may have its own dedicated power source. In the depicted embodiment, controller 70 is also in data communication with control electronics 58 of ORC unit 50, such as by an Ethernet connection 71. Hard-wired relay connections may also be provided between controller 70 and ORC unit 50.

The control architecture is designed to run independently of the heat source. In other words, as long as a sufficient quantity of heat can be captured from the hot air stream induced by induction fan 42, module 10 will generate power. The figures herein depict an air curtain firebox apparatus 2 as a heat source for module 10, but it will be recognized that an air curtain firebox apparatus is only one potential heat source, and that module 10 may be used with other types of heat sources that generate a plume of hot air.

HMI 72 may be configured to allow an operator to enter a desired setpoint temperature into controller 70, and the controller may be programmed to adjust the speed of fan motor 44 based on measured temperature of the heat transfer medium as reported by temperature sensor 74 to maintain the measured temperature of the heat transfer medium at or near the setpoint temperature. For example, controller 70 may be programmed to run a conventional PID (Proportional+Integral+Derivative) control loop which varies the induction fan speed (and hence hot air flow) based on the temperature of the heat transfer medium measured by temperature sensor 74. The control loop maintains the temperature of the heat transfer medium, within practical limits, by increasing the speed of fan motor 44 when the temperature of the heat transfer medium is below the setpoint temperature, and decreasing the speed of fan motor 44 when the temperature of the heat transfer medium is above the setpoint temperature. An electrical signal representing the measured temperature of the heat transfer medium is compared to another electrical signal representing the setpoint temperature to generate an error signal. Controller 70 is programmed to process this error signal by multiplying it by a series of gains for the proportional, integral and derivative control functions being executed by the controller, and to output a drive command to the variable-speed fan motor 44.

During normal operation (i.e. between initial "heat up" and final "burn down" phases), hood 14 may be left in its fully extended position over the heat source, and pump 62 may run at a constant speed, resulting in a constant flow of the heat transfer medium through to ORC unit 50. If desired, a control scheme may be provided wherein the flow rate of the heat transfer medium may be modified in order to improve energy extraction over the entire operating range of the machine: heat up, normal operation, and burn down. Under such a control scheme, controller 70 may be programmed to issue a drive command to adjust the operating speed of variable speed pump motor 64 to adjust the flow rate of the heat transfer medium.

Controller 70 may be programmed to implement a "high-heat" mode for normal operation, and a "low-heat" mode for heat up and burn down phases. For the high-heat mode, the operator may enter a maximum temperature and a minimum temperature into controller 70 using HMI 72. When the temperature of the heat transfer medium measured by temperature sensor 74 approaches or reaches the maximum temperature, controller 70 is programmed to issue a drive command to actuator 26 to move hood 14 to its fully retracted position so that the maximum temperature is not exceeded. Retracting hood 14 effectively shuts off the heat input to module 10 and allows the temperature of the heat transfer medium to decrease. Hood 14 remains in its retracted position until the temperature of the heat transfer medium approaches the minimum temperature. Controller 70 is programmed such that when the measured temperature of the heat transfer medium approaches or reaches the minimum temperature, controller 70 issues a drive command to actuator 26 to move hood 14 to its fully extended position. The hysteresis or deadband between the maximum and minimum temperatures is defined by the operator during the machine setup or commissioning phase, and can be adjusted by a technician via remote connection to HMI 72. In this way, the temperature of the heat transfer medium during normal operation may be maintained substantially within a range settable by an operator.

The low-heat mode helps minimize the parasitic electrical power loads from the equipment during periods of low heat, particularly during the burn-down phase after the operator discontinues the fuel supply to the heat source. This is particularly advantageous in applications where there is a significant amount of residual heat in the last load of fuel. If after a period of time controller 70 determines that the temperature of the heat transfer medium is not responding appropriately to normal control commands, controller 70 then interrogates one or more sensors, for example temperature sensor 76 measuring the temperature of hot gas as it enters hood 14, and determines whether the heat being supplied to module 10 is diminished. If so, controller 70 is programmed to issue a command or commands reducing the speed of fan motor 44 and/or pump motor 64 in order to reduce the parasitic electrical power loads on the module, thereby maximizing the available energy for storage or delivery to the power grid. The module will stay in this idle or burn-down mode until ORC unit 50 shuts down as a result of insufficient heat available from the heat transfer medium. Controller 70 may be programmed to periodically interrogate module sensors such as temperature sensor 76 to determine if the fuel supply of the heat source has been replenished, and if so, to transition back to high-heat mode for normal operation.

If desired, controller 70 may be programmed to command actuator 26 so as to actively control the position of hood 18 in order to improve energy extraction over the entire operating range of the machine: heat up, normal operation and burn down. Actuator 26 may be commanded to move hood 14 into any desired position in between the fully extended and fully retracted positions to adjust heat intake.

Figure 2:
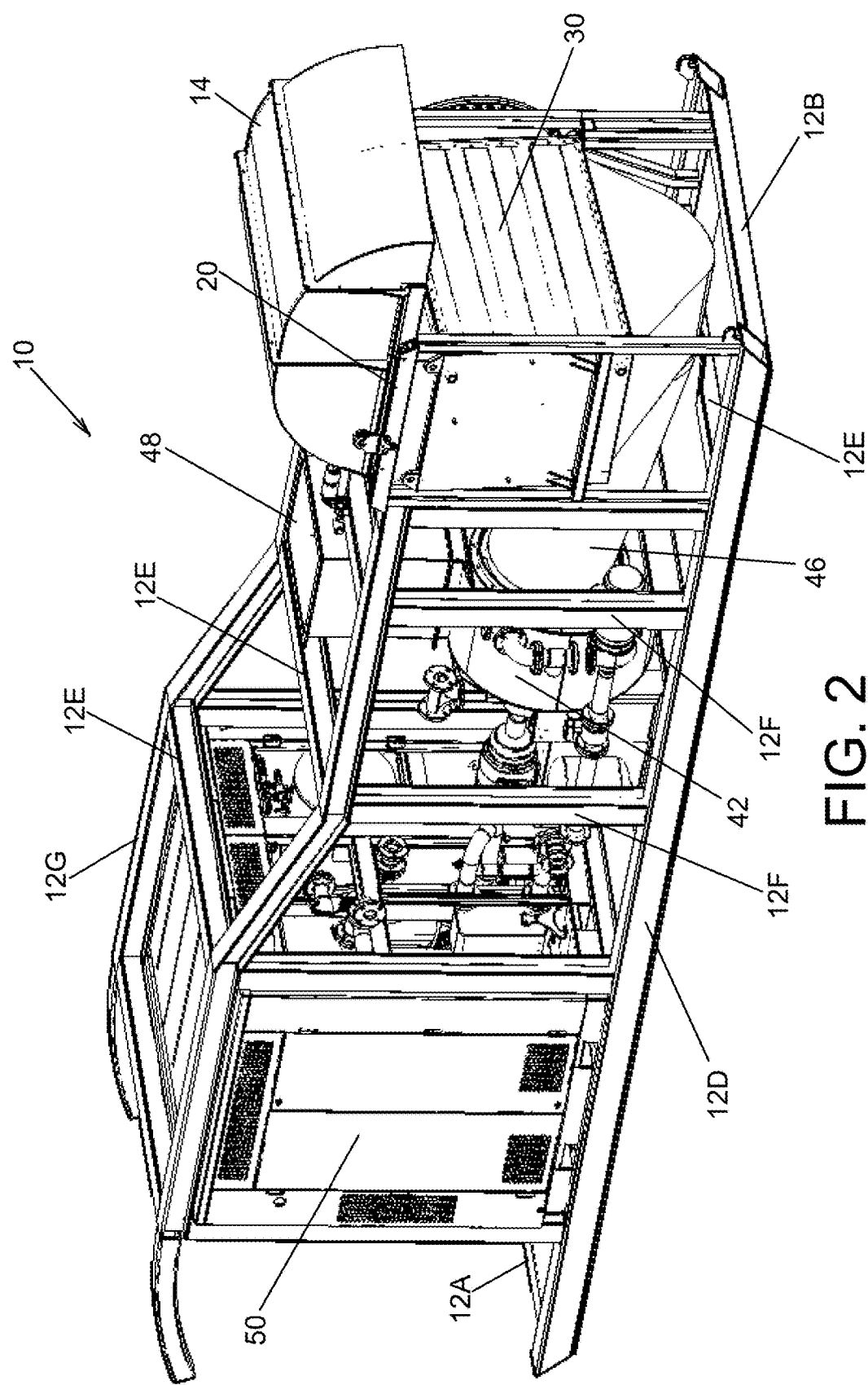
FIG. 2 is another perspective view of the power generating module shown in FIG. 1, wherein wall panels of the power generating module are omitted to reveal internal structure.
Figure 3:
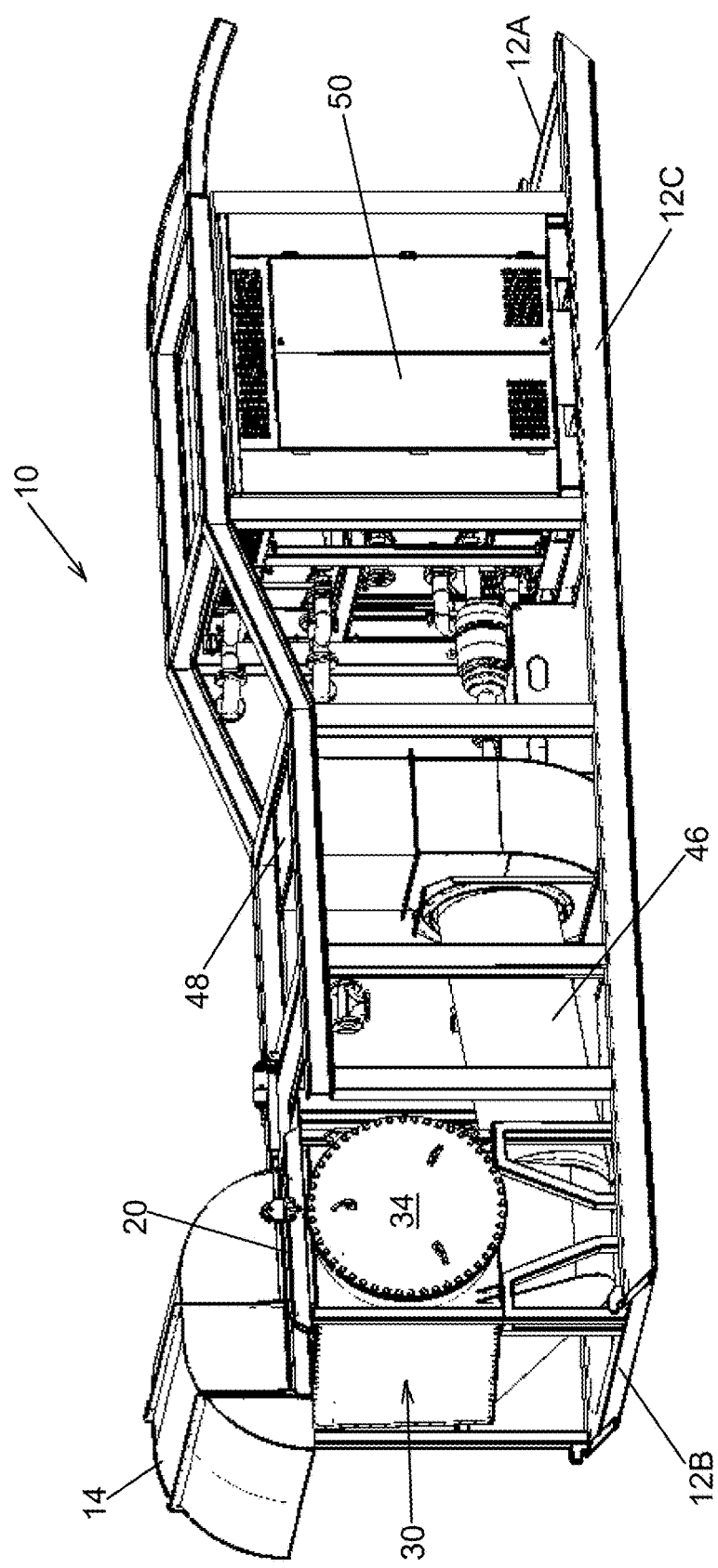
FIG. 3 is a further perspective view of the power generating module without wall panels.

Power generating module 10 depicted in FIGS. 1-3 is considered a specific form or embodiment of a more generic power generating system of the present invention due to the fact that ORC unit 50 is supported on frame 12 for transport together with other system components. However, ORC unit 50 may be a separate unit that is not supported on frame 12. Thus, a power generating system of the present invention may also be formed by separately transporting ORC unit 50 and a heat capturing module comprising the remaining system components supported on frame 12 to a location having a source of heat, and operatively connecting the ORC unit 50 to the heat capturing module at the location. In this regard, it will be understood that the invention may be embodied by a standalone heat capturing module. Examples of heat capturing modules will now be described with reference to FIGS. 8 and 9.

Figure 8:
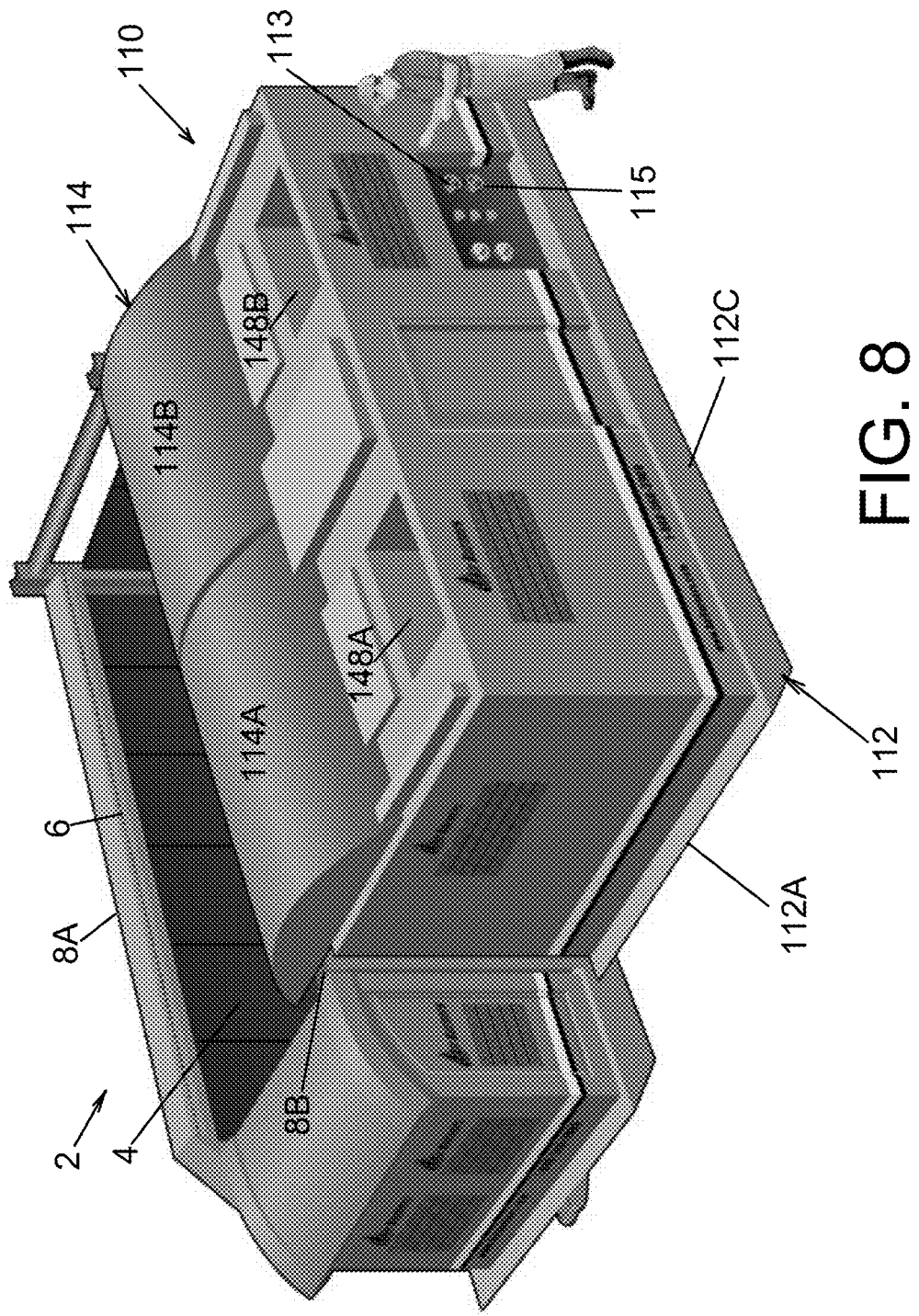
FIG. 8 is a perspective view of a heat capturing module formed in accordance with another embodiment of the present invention, wherein the heat capturing module is shown adjacent an air curtain firebox.

FIG. 8 depicts a heat capturing module 110 embodying the present invention, wherein the heat capturing module 110 is arranged adjacent longitudinal side 8B of the firebox 4 of air curtain firebox apparatus 2. The process components of heat capturing module 110 may be mounted on a frame 112 that includes a pair of ends (only one end 112A being visible) connected by a pair of longitudinal sides (only one longitudinal side 112C being visible) to define an elongated rectangular footprint. Members of frame 112 may define a skid enabling module 110 to be loaded onto a truck trailer. As will be understood from FIG. 8, heat capturing module 110 has a hood 114 that protrudes out from at least one longitudinal side of frame 112 in the extended position and is made to extend substantially the entire length of firebox 4. Consequently, hood 114 is sized to capture more heat than hood 14 of power generating module 10 described above. Of course, hood 114 may be made shorter in length and arranged to protrude out from one end of frame 112 in the extended position.

Heat capturing module 110 in FIG. 8 is intended to supply a heat transfer medium (e.g. water or thermal oil) in a heated state to an external system that uses the heat carried by the heat transfer medium. For example, heat capturing module 110 may be used in combination with a standalone ORC unit (not shown) that is not mounted on frame 112 to form a power generating system. Thus, heat capturing module 110 may comprise all the components found in power generating module 10 with the exception of ORC unit 50 and possibly a portion of closed flow loop 60 that carries the heat transfer medium. Heat capturing module 110 may have an entire closed flow loop configured for operative deployment in the external system, or heat capturing module 110 may have a portion of a closed flow loop that mates with another flow loop portion provided in the external system. In the latter case, heat capturing module 110 may include an outflow port 113 and an inflow port 115 for connection to opposite ports in the external system to form a complete closed loop through which the heat transfer medium travels.

In an aspect of the invention, hood 114 of heat capturing module 110 may be embodied as a pair of independently actuated hood portions 114A and 114B each associated with its own dedicated heat exchange assembly and exhaust system, as may be understood by observing that two exhaust chutes 148A and 148B appear in FIG. 8.

Figure 9:
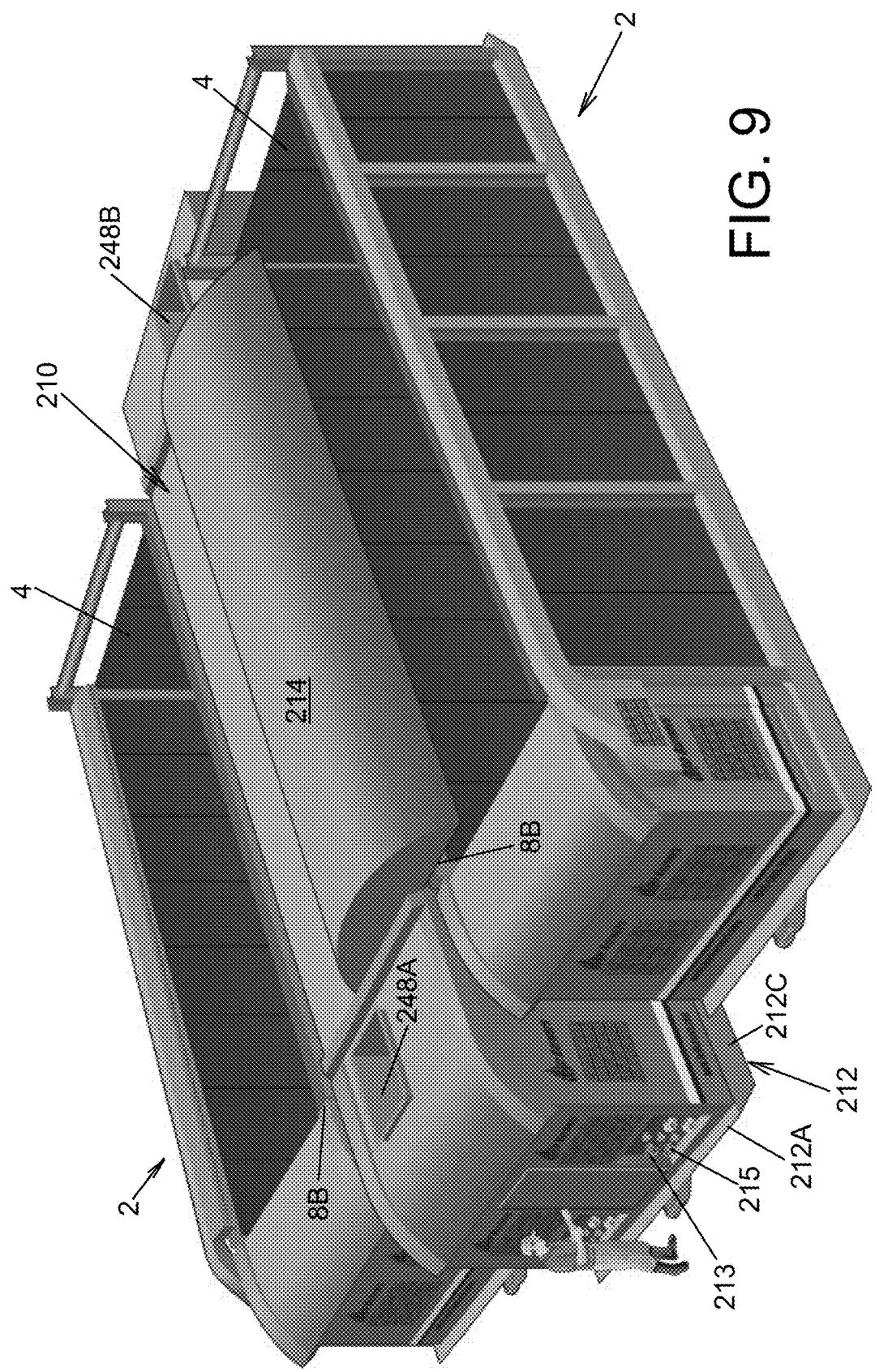
FIG. 9 is a perspective view of another heat capturing module formed in accordance with a further embodiment of the present invention, wherein the heat capturing module is shown between a pair of air curtain fireboxes.

FIG. 9 shows a heat capturing module 210 embodying the present invention, wherein the heat capturing module is situated between a pair of air curtain firebox apparatus 2 adjacent longitudinal side 8B of each firebox 4. The process components of heat capturing module 210 may be mounted on a frame 212 that includes a pair of ends (only one end 212A being visible) connected by a pair of longitudinal sides (only one longitudinal side 212C being visible) to define an elongated rectangular footprint. Members of frame 212 may define a skid enabling module 210 to be loaded onto a truck trailer. As will be understood from FIG. 9, heat capturing module 210 includes a hood 214 having two selectable extended positions, wherein the hood protrudes out from one longitudinal side of the frame in one extended position and protrudes out from the other longitudinal side of the frame in the other extended position. In this way, hood 214 may be moved to capture heat from either of the fireboxes 4 as desired. This feature enables one firebox 4 to be refilled while heat is captured from fuel burning in the other firebox, thereby allowing continuous operation and continuous power generation. Similar to heat capturing module 110 of FIG. 8, heat capturing module 210 may have dual exhaust systems as represented by exhaust chutes 248A and 248B. Likewise, heat capturing module 210 may include an outflow port 213 and an inflow port 215 for connection to opposite ports in an external system to form a complete closed loop through which the heat transfer medium travels.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A heat capturing module comprising:
    a frame;
    a hood defining an internal space and having a bottom intake opening in flow communication with the internal space, the hood being mounted on the frame for movement relative to the frame between a retracted position and an extended position, wherein the hood is capable of receiving a plume of hot gas through the bottom intake opening when the hood is in the extended position;
    an actuator connected to the hood, the actuator being operable to move the hood between the retracted and extended positions;
    a heat exchange assembly in flow communication with the internal space of the hood for receiving hot gas from the hood;
    a controller connected to the actuator;
    a human-machine interface operable to enter data into the controller; and
    a closed flow loop or a flow loop portion carrying a heat transfer medium, wherein the closed flow loop or flow loop portion is configured to direct flow of the heat transfer medium through the heat exchange assembly, wherein the heat transfer medium enters the heat exchange assembly in a cooled state, exits the heat exchange assembly in a heated state, and flows to an external system to provide thermal energy to the external system, and returns to the heat exchange assembly from the external system in a cooled state;
    wherein the frame includes a pair of ends connected by a pair of longitudinal sides to define an elongated footprint, and the hood protrudes out from one end of the frame in the extended position.

2. The heat capturing module according to claim 1, further comprising a temperature sensor arranged to measure a temperature of the heat transfer medium in the heated state, wherein the temperature sensor is in communication with the controller to input a measured temperature of the heat transfer medium to the controller.

3. The heat capturing module according to claim 2, further comprising an exhaust system configured to direct exhaust gas from the heat exchange assembly to atmosphere, the exhaust system including an induction fan having a variable speed fan motor, wherein the controller is connected to the variable speed fan motor.

4. The heat capturing module according to claim 3, wherein the human-machine interface is operable to enter a setpoint temperature into the controller, and the controller is programmed to adjust the speed of the variable speed fan motor based on the measured temperature of the heat transfer medium to maintain the measured temperature of the heat transfer medium at or near the setpoint temperature.

5. The heat capturing module according to claim 2, wherein the human-machine interface is operable to enter a maximum temperature into the controller, the controller is connected to the actuator, and the controller is programmed to command the actuator to move the hood toward the retracted position to keep the measured temperature of the heat transfer medium from exceeding the maximum temperature.

6. The heat capturing module according to claim 5, wherein the human-machine interface is operable to enter a minimum temperature into the controller, and the controller is programmed to command the actuator to move the hood toward the extended position to keep the measured temperature of the heat transfer medium from dropping below the minimum temperature.

7. The heat capturing module according to claim 1, wherein the closed flow loop includes a pump driven by a variable speed pump motor, wherein the variable speed pump motor is connected to the controller, whereby a flow rate of the heat transfer medium through the closed flow loop is adjustable.

8. The heat capturing module according to claim 1, wherein the retracted position and the extended position are approximately sixteen inches apart.

9. The heat capturing module according to claim 1, wherein the heat exchange assembly includes a plurality of heat pipes arranged in a flow stream of the hot gas.

10. The heat capturing module according to claim 1, wherein the frame is configured such that the heat capturing module is transportable on a truck trailer.

11. A heat capturing module comprising:
a frame;
a hood defining an internal space and having a bottom intake opening in flow communication with the internal space, the hood being mounted on the frame for movement relative to the frame between a retracted position and an extended position, wherein the hood is capable of receiving a plume of hot gas through the bottom intake opening when the hood is in the extended position;
an actuator connected to the hood, the actuator being operable to move the hood between the retracted and extended positions;
a heat exchange assembly in flow communication with the internal space of the hood for receiving hot gas from the hood;
a controller connected to the actuator;
a human-machine interface operable to enter data into the controller; and
a closed flow loop or a flow loop portion carrying a heat transfer medium, wherein the closed flow loop or flow loop portion is configured to direct flow of the heat transfer medium through the heat exchange assembly, wherein the heat transfer medium enters the heat exchange assembly in a cooled state, exits the heat exchange assembly in a heated state, and flows to an external system to provide thermal energy to the external system, and returns to the heat exchange assembly from the external system in a cooled state;
wherein the frame includes a pair of ends connected by a pair of longitudinal sides to define an elongated footprint, and the hood protrudes out from at least one longitudinal side of the frame in the extended position.

12. The heat capturing module according to claim 11, wherein the hood includes two selectable extended positions, wherein the hood protrudes out from one longitudinal side of the frame in one extended position and protrudes out from the other longitudinal side of the frame in the other extended position.

13. The heat capturing module according to claim 11, further comprising a temperature sensor arranged to measure a temperature of the heat transfer medium in the heated state, wherein the temperature sensor is in communication with the controller to input a measured temperature of the heat transfer medium to the controller.

14. The heat capturing module according to claim 13, further comprising an exhaust system configured to direct exhaust gas from the heat exchange assembly to atmosphere, the exhaust system including an induction fan having a variable speed fan motor, wherein the controller is connected to the variable speed fan motor.

15. The heat capturing module according to claim 14, wherein the human-machine interface is operable to enter a setpoint temperature into the controller, and the controller is programmed to adjust the speed of the variable speed fan motor based on the measured temperature of the heat transfer medium to maintain the measured temperature of the heat transfer medium at or near the setpoint temperature.

16. The heat capturing module according to claim 13, wherein the human-machine interface is operable to enter a maximum temperature into the controller, the controller is connected to the actuator, and the controller is programmed to command the actuator to move the hood toward the retracted position to keep the measured temperature of the heat transfer medium from exceeding the maximum temperature.

17. The heat capturing module according to claim 16, wherein the human-machine interface is operable to enter a minimum temperature into the controller, and the controller is programmed to command the actuator to move the hood toward the extended position to keep the measured temperature of the heat transfer medium from dropping below the minimum temperature.

18. The heat capturing module according to claim 11, wherein the closed flow loop includes a pump driven by a variable speed pump motor, wherein the variable speed pump motor is connected to the controller, whereby a flow rate of the heat transfer medium through the closed flow loop is adjustable.

19. The heat capturing module according to claim 11, wherein the retracted position and the extended position are approximately sixteen inches apart.

20. The heat capturing module according to claim 11, wherein the heat exchange assembly includes a plurality of heat pipes arranged in a flow stream of the hot gas.

21. The heat capturing module according to claim 11, wherein the frame is configured such that the heat capturing module is transportable on a truck trailer.

* * * * *